United States Patent [19]
Kuipers

[11] 3,983,474
[45] Sept. 28, 1976

[54] TRACKING AND DETERMINING ORIENTATION OF OBJECT USING COORDINATE TRANSFORMATION MEANS, SYSTEM AND PROCESS

[75] Inventor: Jack Kuipers, Grand Rapids, Mich.

[73] Assignee: Polhemus Navigation Sciences, Inc., Burlington, Vt.

[22] Filed: Feb. 21, 1975

[21] Appl. No.: 551,984

[52] U.S. Cl. .................................. 324/43 R; 318/16; 324/41; 340/258 C; 343/100 CS
[51] Int. Cl.² ........................................ G01R 33/02
[58] Field of Search .................. 324/41, 43 R, 34 R; 340/258 C; 318/16, 447, 453; 343/100 CS

[56] References Cited
UNITED STATES PATENTS

| | | | |
|---|---|---|---|
| 3,526,886 | 9/1970 | Lubich | 324/41 |
| 3,529,682 | 9/1970 | Coyne et al. | 340/258 C |
| 3,560,977 | 2/1971 | Cayzac | 343/100 CS |
| 3,644,825 | 2/1972 | Davis, Jr. et al. | 324/41 |
| 3,656,161 | 4/1972 | MacPherson | 340/258 C |
| 3,731,752 | 5/1973 | Schad | 324/43 R |

OTHER PUBLICATIONS

Kalmus, H., A New Guiding & Tracking System, IRE Trans. on Aerospace, Mar. 1962, pp. 7–10.

*Primary Examiner*—Robert J. Corcoran
*Attorney, Agent, or Firm*—Price, Heneveld, Huizenga & Cooper

[57] ABSTRACT

An electromagnetic field which nutates about a pointing vector is used to both track or locate a remote object in addition to determining the relative orientation of the object. Apparatus for generating such a field includes mutually orthogonal dipole radiators, defining a reference coordinate frame, and circuitry for supplying excitations, such that the maximum intensity vector of a vector field produced by these excitations in the radiators nutates about a mean axis or axis of nutation which is called the pointing vector direction of the field. A pointing coordinate frame has the x-axis coincident with the pointing vector and the y-axis in the x-y plane of the reference frame. Mutually orthogonal sensors at the object sense the field and establish a sense coordinate frame, which can be coincident with the coordinate frame of the remote body.

Coordinate transformer means, system and process are used in connection with determining the pointing and angular position of the sense frame with respect to the reference frame. A first error signal relating the sense frame to the pointing frame is transformed into a second error signal relating the sense frame to the reference frame. This second error signal is used to generate the three Euler angles defining the orientation of the sense frame relative to the reference frame and to generate the pointing angles defining the translation of the sense frame from the reference frame.

Means, system and process are described, thus, capable of continuously measuring five independent angles through the use of one field generating means, one field sensing means at the remote object, and signal processing means. Two of the angles specify the direction to, or location of, the remote object and the remaining three angles define the angular orientation of the remote object, the angles defining the sense frame with respect to the fixed reference coordinate frame of the field generating means.

10 Claims, 7 Drawing Figures

TRACKING AND DETERMINING ORIENTATION OF OBJECT USING COORDINATE TRANSFORMATION MEANS, SYSTEM AND PROCESS

BACKGROUND OF THE INVENTION

I. Field of the Invention

This invention relates to an object locating or tracking system or process in which a vector field which is caused to nutate about an axis called the pointing vector, is used to locate or track a remote object. More particularly, the invention relates to such a system or process which is capable of transforming error components of translation and of angular orientation of a remote object from one coordinate frame into another coordinate frame.

II. Description of the Prior Art

The use of orthogonal coils for generating and sensing magnetic fields is well known and has been used in locating and tracking remote objects. For example, U.S. Pat. No. 3,644,825 teaches generating and sensing coils which move with respect to each other. Alternatively, the magnetic field can be made to rotate as taught in Kalmus, "A New Guiding and Tracking System", IRE Transactions on Aerospace and Navigational Electronics, March 1962, pages 7 through 10.

The use of coordinate transformers to determine the orientation of a first coordinate system with respect to a second coordinate system is well known. For example, U.S. Pat. Nos. 3,474,241 and 3,660,648 disclose transformers which transform angular rates or angular errors measured in a first coordinate frame into angular rates defined about the axes of an intermediate coordinate frame about whose axes the angular rotations or rates are defined and then integrate to determine the angles defining the angle-axis sequence which defines the orientation of the first coordinate frame with respect to a second coordinate frame through the use of Euler angles.

There still remains a need for a way to determine continuously the three errors in the angular orientation of and the two errors in the pointing angles to a remote object in a manner suitable for directly correcting the presumed values of the five angles in addition just to locating or tracking the object. Further, there is a need for a coordinate transformer capable of transforming error components of a translation displacement, as well as an angular orientation displacement, of a remote object from one coordinate frame into another coordinate frame. Such coordinate transformation is not only useful in providing accurate tracking and orientation determination of the remote object but is necessary for providing accurately sensed error information about the pointing to and the orientation of the object relative to a useful coordinate frame, regardless of the attitude assumed by the object.

SUMMARY OF THE INVENTION

Mutually orthogonal radiating coils, defining a reference coordinate frame, emit a magnetic field which nutates about a pointing vector. The magnetic field is detected by mutually orthogonal sense coils defining a sense coordinate frame. A pointing frame is defined as having its x-axis coincident with the pointing vector and its orthogonal y-axis in the x-y plane of the reference frame. Signals are generated or detected in the sense coils. These signals are used to adjust the currents in the radiating coils so the pointing vector points at the sense coils. Simultaneously, these signals are used to adjust the three Euler angles which determine the orientation of the sense coils relative to the orientation of the reference coils. This invention recognizes the fact that coordinate transformer apparatus are useful in controlling the direction of an electrically generated pointing vector which desirably connects the origin of the reference frame and the origin of the sensor frame. The detected signals on the sense coils relate to the errors in the location and orientation of the sense frame as measured in the pointing frame. However, such information concerning the errors in the angular displacement and translation displacement of the sense frame is not typically desired or suitable. Typically, it is more advantageous to obtain the error information representing the correction in the angular and translation displacement of the sense frame not in the pointing frame but with respect to an intermediate frame having axes about which the angular rotation must occur. As a result, the error information is used to correct the presumed, to provide the actual, translation and orientation displacement of the sense frame with respect to the reference frame.

Accordingly, it is an object of this invention to provide a system and process capable of determining both relative translation and relative orientation of remote objects through the use of a vector field.

It is also an object of this invention to recognize a need for coordinate transformation of the error signals detected after processing of the signals generated in the sense coils before corrections are applied to the coils of the radiator in the reference frame.

It is a further object of the invention to provide a system and process for transforming a movement of the sense frame with respect to the pointing frame to a movement of the sense frame with respect to the reference frame.

It is another object of the invention to determine relative translation and orientation of remote objects through use of a field in a continuous manner, so that translation and orientation may be tracked and therefor determined continuously, regardless of pointing and orientation angles.

It is still another object of the invention to provide a system and process for locating an object precisely relative to a reference coordinate frame of the vector field generating means.

It is yet still another object of the invention to provide a system in which a pointing vector defined by a modulated field is used to track an object very precisely.

BRIEF DESCRIPTION OF THE DRAWINGS

FIG. 3b illustrates the circuit corresponding to the pointing angles of FIG. 3a;

DETAILED DESCRIPTION OF THE INVENTION

This invention includes an object tracking and orientation determination means, system and process. Such a means, system and process is disclosed in allowed application, Ser. No. 383,688, filed July 30, 1973, now U.S. Pat. No. 3,868,565, issued Feb. 25, 1975 the disclosure of which is incorporated by reference herein. To aid in the logical explanation of an embodiment of this invention portions of the disclosure are repeated or summarized herein.

Apparatus in accordance with an embodiment of this invention for generating a directable, nutating, magnetic field along a pointing vector includes three orthogonally positioned coils through which excitation currents can be passed. The mutually orthogonal coils define a reference coordinate frame. An orthogonal pointing coordinate frame is defined as having the $x$-axis coincident with the pointing vector and the $y$-axis in the $x$-$y$ plane of the reference frame but orthogonal to this $x$-axis. The $z$-axis is mutually orthogonal to the above mentioned $x$ and $y$ axes, sensed according to the right hand rule. With all pointing and orientation angles equal to zero, the pointing frame, the reference frame and the sense frame are all coincident. The nutation desirably describes a conical motion about the pointing vector of the field, the conical apex at the intersection of the radiator or excitor coils. Such a nutating field can be generated by the combination of a DC signal in one of the coils, an AC signal in a second coil, and another AC signal having a phase in quadrature with the phase of the first AC signal, passed through the third coil, all three coils being mutually, spacially orthogonal. The pointing vector is fixed to the direction of the axis of the DC field. To make this nutating field directable, a signal processing means known as a coordinate transformation circuit must operate on the reference AC and DC excitation signals in order to point the nutating field in the desired direction. A brief discussion of the coordinate transformation known as a rotation is presented as background in order to properly teach the principles underlying the techniques employed in this invention.

Figure 1:
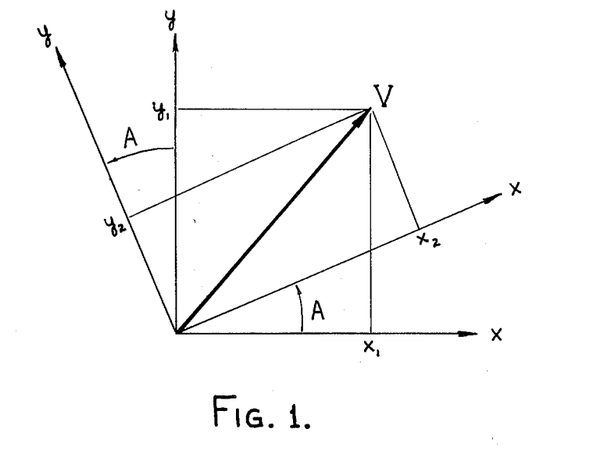
FIG. 1 describes the geometry of a simple coordinate transformation called a rotation.
Figure 2:
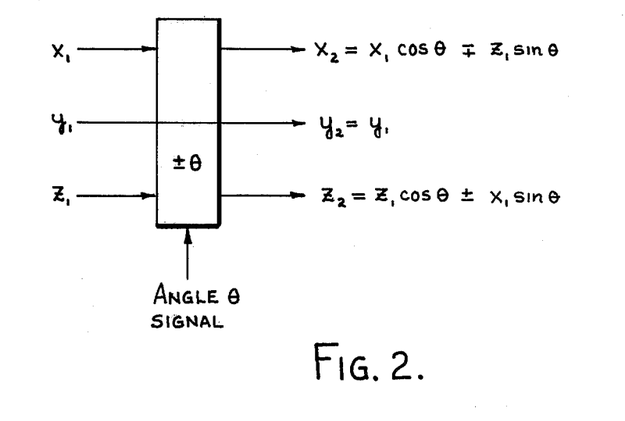
FIG. 2 is the block diagram representation of a single rotation operator, as in FIG. 1, called a Resolver.

A vector transformed by pure rotation from one coordinate frame into another coordinate frame is also said to be resolved from the one into the other coordinate frame. Resolve and resolution in this context are synonyms for transform and transformation. The operator which transforms the components of a given vector in one coordinate frame into its components in another coordinate frame where the two coordinate frames are related by a simple angular rotation is defined as a resolver. The equations governing this transformation are:

$x_2 = x_1\cos A + y_1\sin A$ $y_2 = y_1\cos A - x_1\sin A$ $z_2 = z_1$ where in this case the $z_1$ axis is the axis of rotation. The equations are readily verified from the geometry illustrated in FIG. 1. Note that when the two components operated on by the resolver are ordered positively ($zxyzxy$ . . . ) then the first component of the positively ordered pair always has the positive sine term when the angle of rotation is positive. If the angle of rotation is negative then the sign of the sine terms reverses. A convenient notation for a resolver is the block shown in FIG. 2 where the rotation in this case is shown as negative about the $y$-axis. The $y$ component is therefore not affected by the transformation and this fact is indicated in this notation by passing that component directly through the box as shown, whereas, the resolver block representing FIG. 1 would show the $z_1$ axis passing directly through the box. This notation should be regarded as a signal flow or block diagram for vector components, particularly useful in describing the computational strategy employed in this invention.

Figure 3A:
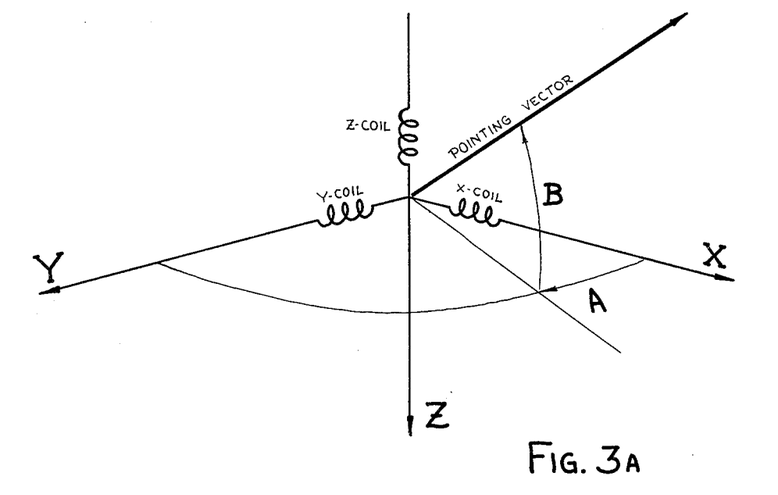
FIG. 3a shows the pointing angles defined for three-dimensional pointing.
Figure 3B:
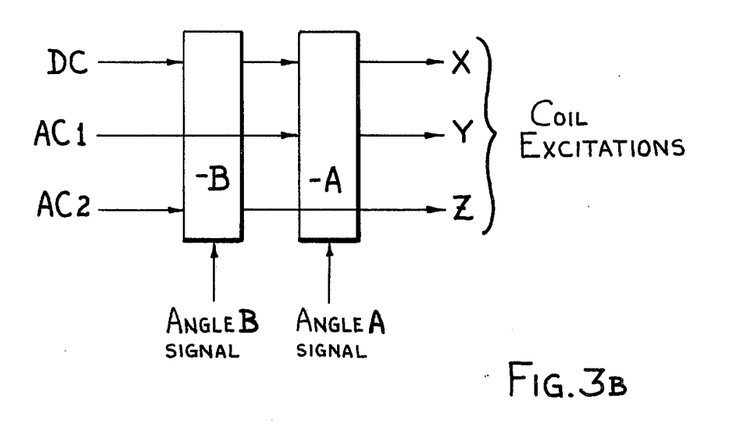

A process in accordance with an embodiment of this invention includes the generation of a directable, nutating field, nutating about an axis called the pointing vector. The reference nutation excitation vector consists of three components: a DC and two AC signals quadrature related. The pointing vector and its entire nutating magnetic field structure are pointed in any desired direction defined in terms of angles A and B, in this case. FIG. 3 illustrates the pointing geometry and the computational coordinate transformation circuitry necessary for achieving the desired pointing direction by operating on the given three reference excitation signals. A more detailed explanation of coordinate transformations, calculations and applications is contained in Kuipers, J., *Solution and Simulation of Certain Kinematics and Dynamics Problems Using Resolvers*, Proceedings of the Fifth Congress of the International Association for Analog Computation, Lausanne, Switzerland, Aug. 28 – Sept. 2, 1967, pages 125 – 134, the disclosure of which is incorporated by reference herein.

The position of an object relative to the pointing vector of the field is determined from the processed relationship between the field components sensed in coils in each of the orthogonal axes of a sense coordinate frame attached to the object. To track the object, the pointing vector of the nutating field is moved until the field sensed on the axes, after appropriate coordinate transformation processing, indicates that the object lies along the pointing vector. This has taken place when the processed signal resulting from the sensed nutating field is magnitude invariant over the nutation cycle. If a pointing error exists, then the amplitude of the modulation sensed in the pointing direction is proportional to the angular displacement of the object from the pointing vector.

The angular orientation of the object is specified, in general, by three Euler (see Kuipers' referenced paper) angles measured relative to the reference coordinate frame at the generator. Two of the error measures of angular orientation are proportional to whatever non-zero projections of the sensed and processed DC field component exist in the coordinate directions of the plane perpendicular to the pointing direction. The third angular error measure is proportional to the relative phase of the sensed and processed nutation signals in this orthogonal plane, compared to the nutation reference excitation at the generator means.

The above discussion explains that the error signals measured in the sense coils are relative to the pointing vector and, in turn, to the pointing frame. However, for locating and determining the orientation of the sense frame, it is more desirable to have the measured errors transformed into an intermediate coordinate frame. This is because this particular intermediate frame is directly appropriate for making the required corrections in the respective angles.

The orientation of the three orthogonal axes of the sense frame can be specified with respect to the reference frame by the Euler angles. Consequently, in accordance with an embodiment of this invention, there is included an apparatus which can transform the orientation displacement of the sense frame from the pointing frame into angular corrections to previously determined Euler angles required to rotate the reference frame into the orientation of the sense frame. There is an analogous problem in determining the translation displacement of the sense frame from the reference frame. The translation displacement from the pointing frame to the sense frame can be readily determined. However, as already noted, it would be more desirable to determine the translation displacement of the sense frame from the pointing vector with respect to the reference frame.

It can be appreciated that when the pointing frame and the reference frame are coincident that the aforementioned transformation is not necessary. When this coincidence occurs, the pointing vector is along the $x$-axis of the reference frame and along the $x$-axis of the pointing frame. Consequently, any displacement of the sense frame from the $x$-axis of the pointing frame is the same as the displacement of the sense frame from the $x$-axis of the reference frame. Therefore, an error defining the displacement, translation or orientation, of the sense frame from the pointing frame can be used directly to correct the components of electric currents on the axes of the reference frame which generate the pointing vector. Also, the position and orientation of the sense frame with respect to the reference frame can be determined. It can further be appreciated that there can be some deviation from haaving the pointing frame coincident with the reference frame and still use errors with respect to the pointing frame to correct the position of the pointing vector with respect to the reference frame. However, for example, in a situation where the $x$-axis of the pointing frame is coincident with the $z$-axis of the reference frame, it is clear that an error about the $x$-axis of the pointing frame cannot be used to provide a correction with respect to the $x$-axis of the reference frame. It can be appreciated that the correction should be made about the $z$-axis of the reference frame. A coordinate transformer apparatus in accordance with an embodiment of this invention is introduced into the orientation and tracking system to make sure that proper corrections are made.

Figure 4:
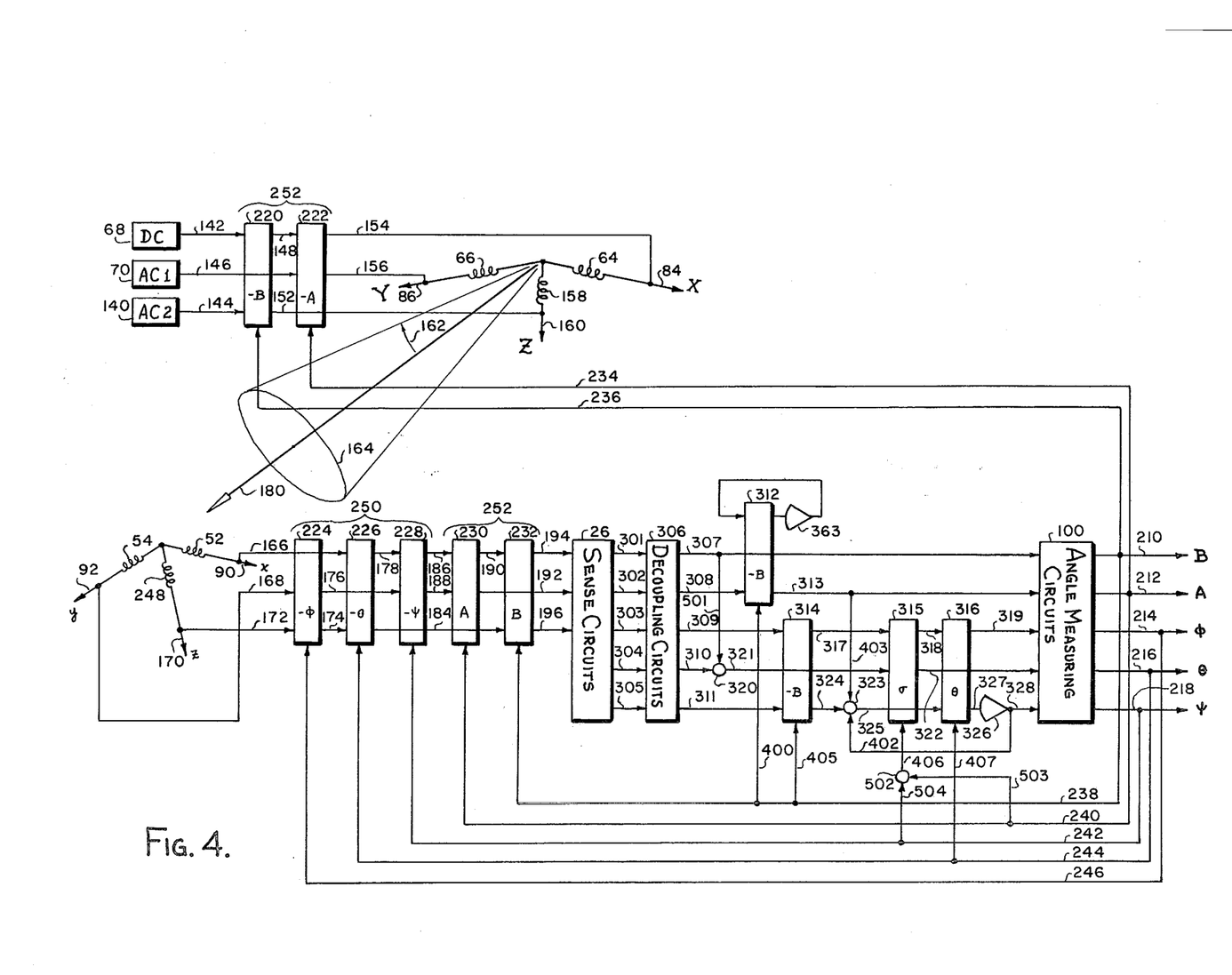
FIG. 4 is a schematic representation of a system in accordance with the invention which will track the location or direction and the relative angular orientation of an object free to move in three-dimensions.

FIG. 4 illustrates a tracking and orientation determination system using coordinate transformation means. The system includes mutually orthogonal magnetic field generating coils 158, 64 and 66 and mutually orthogonal magnetic field sensing coils 248, 52 and 54. For ease of understanding, the three coils in each case have been shown as spacially separated. In actuality, the magnetic axes of both the generator coils and the sensor coils intersect in a mutually orthogonal relationship as shown by the cartesian coordinate frames 84, 86, 160, the reference frame, and 90, 92, 170, the sense frame, respectively. Pointing frame excitation signals AC1 and AC2 are quadrature related or 90 degree phase related. They may be considered as sinusoids of equal amplitude but 90 degrees out of phase, although the two signals AC1 and AC2 need not necessarily be sinusoidal in the practical embodiment of the system. Reference is again made to FIG. 3 which was related to the earlier discussion of coordinate transformation circuitry and which shows the three dimensional pointing geometry. The ability to point the pointing vector 180 in any direction in which the assembly of sensing coils 52, 54 and 248 are free to move enables the sensing coils to be tracked. The pointing excitation DC, AC1 and AC2 signals from sources 68, 70 and 140, respectively, define a conically nutating 164 magnetic field about a pointing axis 180 which is coincident with the axis of the DC component of the field. It should be emphasized again that the pointing of the vector 180 is accomplished electrically by the circuit to be described while the generating coils 64, 66 and 158 maintain a fixed orientation physically. DC source 68 and AC2 source 140 are connected by leads 142 and 144, respectively, to resolver 220, whose output lead 148 and output lead 146 from AC1 source 70 are connected to resolver 222. The output leads 154 and 156 provide reference frame excitation signals from resolver 222 to generator coils 64 and 66, respectively. Generator coil 158 is excited through connection 152 from the output of resolver 220. The two angles A and B of resolver 222 and 220, respectively, are thus operating on the pointing frame nutating field vector input whose components are the pointing frame excitations from sources 68, 70 and 140, so as to provide reference frame excitations to point the pointing vector 180 and its attendant nutating field structure in accordance with the geometry shown in FIG. 3. The pointing vector 180 is presumed to be pointing nominally at the sensor which is fixed to the remote object to be tracked by the system. This sensor consists of the three mutually orthogonal sensor coils 52, 54 and 248, which are fixed to the remote object and in the preferred embodiment are aligned to the principal axes of the remote object, so that in the process of determining the orientation of the sensor triad the orientation of the remote object is therefore determined. The signals induced in the sensor coils 52, 54 and 248 depend on the orientation of their sensor coordinate frame, defined by the mutually orthogonal coordinate axes 90, 92 and 170, relative to the pointing axis 180 and its two orthogonal nutation components of the nutating field. In other words, the particular mixing of the three excitation signals DC, AC1, and AC2 from sources 68, 70 and 140, induced in each of the three sensor coils 52, 54 and 248, depends not only upon the two pointing angles A and B which govern the composite pointing coordinate transformation circuit 252 but also upon the three Euler angles defining the relative angular orientation of the remote object and which govern the composite orientation coordinate transformation circuit 250. The principal function of the two coordinate transformation circuits 250 and 252 in the overall computational strategy of the system is that the transformation circuit 250 unmixes that part of the reference signal mix induced in the sensor coils attributable to the relative orientation of the remote object, and coordinate transformation circuit 252 unmixes the remaining part of the reference signal mix that was due to the pointing angles. If the three orientation angles defining coordinate transformation circuit 250 and the two pointing angles defining the coordinate transformation circuit 252 properly represent the physical relationship between the sensor and generator coordinate frames, then the signals sensed by the sense circuits 26 will correspond to the unmixed pointing frame signals DC, AC1 and AC2, respectively, from sources 68, 70 and 140.

The sensor coils 54 and 248 are connected to resolver 224 by leads 168 and 172, respectively. The output of sensor coils 52 and one output from resolver 224 connect to resolver 226 by leads 166 and 174, respectively. One output from resolver 224 and one output from resolver 226 connect to resolver 228 by leads 176 and 178, respectively. The two outputs from resolver 228 are connected to resolver 230 by leads 186 and 188, respectively. One output from resolver 226 and one output from resolver 230 connect to resolver 232 on leads 184 and 190, respectively. One output from resolver 230 and the two outputs from resolver 232 provide the processed signal inputs to sense circuits 26 by connections 192, 194 and 196, respectively.

Sense circuits 26 operates on the three input signals, provided by leads 194, 192 and 196, to sense deviations from their nominally correct values which should correspond to the pointing frame excitation signal components 68, 70 and 140, respectively. The operation of sense circuits 26 is described in the afore mentioned allowed application. Basically, sense circuits 26 compare an input vector in the pointing frame from sources 68, 70 and 140 to an output vector in the sensing frame from inputs 192, 194 and 196. This comparison develops an error or displacement of the sense frame from where it was expected to be. This error is expressed as five angular errors. Accordingly, the output of sense circuits 26 are five angular errors, two dealing with position or translation angles and three dealing with orientation angles. To define the sense frame with respect to the reference frame, it is desirable to convert these errors defined in the pointing frame to errors in an intermediate coordinate frame. Orientation angle errors transformed into this intermediate frame correspond directly to the angular error of the respective Euler angle. That is, the errors appearing on the $x$, $y$, and $z$-axes of the intermediate frame correspond to the errors in the phi, theta, and psi Euler angles, respectively. Translation angle errors transformed into this intermediate frame correspond directly to the angular error of the respective pointing angle. That is, the errors appearing on the $y$ and $z$ axes of the intermediate frame correspond to the errors of the pointing angles, B and A, respectively. Once Euler angles psi, phi and theta and pointing angles A and B have been corrected, the translation and orientation of sense frame is defined with respect to the reference frame.

Due to the nature of the nutating dipole vector field structure, the five angular errors measured in the pointing frame are coupled. That is, a pure pointing error gives a measurable error in both pointing and orientation and vice versa. However, understanding the dipole structure of the nutating field allows one to uncouple these errors using techniques well known in the art. Accordingly, FIG. 4 shows five outputs 301, 302, 303, 304 and 305 from sense circuits 26 connected to a decoupler 306.

Decoupler 306 has outputs 307, 308, 309, 310 and 311 which are uncoupled angular errors defined in the pointing frame. The uncoupled angular errors are called $e_1$, $e_2$, $e_3$, $e_4$ and $e_5$. As discussed, it is desired to obtain angular error corrections for pointing angles A and B which define the pointing vector in the reference frame. Further, it is desired to obtain angular error corrections for presumed Euler angles phi, theta and psi which presumably define the orientation of the sense frame with respect to the reference frame. Accordingly, each of the angular errors in the pointing frame is subjected to appropriate transformations to give the desired angular errors in an intermediate frame appropriate to the pointing and Euler angles in the transformation.

The pointing errors defined in the pointing frame are components $e_1$ and $e_2$. As can be seen from FIG. 4, $e_1$ and $e_2$ are operated on by a resolver 312 to produce the angular error corrections for angles A and B. Resolver 312 continually performs a rotation of angle B about the $y$-axis. Input 400 to resolver 312 supplies such an angle. As is shown, the error angle of B is available directly on output line 307 and is coupled directly to an angle measuring circuit 100. An output line 313 from resolver 312 provides the error angle of angle A and is connected to angle measuring circuit 100. The function of a feedback amplifier 363, also connected to resolver 312, is described later.

Orientation angle errors expressed as components in the pointing frame are $e_3$, $e_4$ and $e_5$. As shown in FIG. 4, they are operated on by resolvers 314, 315 and 316. Resolver 314 is connected to resolver 315 by an output line 317; resolver 315 is connected to resolver 316 by an output line 318; resolver 316 is connected to angle measuring circuit 100 by an output line 319. Decoupler output line 310 is connected to a summer 320 which in turn is connected to resolver 315 by an output line 321. A connection line 501 connects line 307 to summer 320. Resolver 315 is connected by an output line 322 to angle measuring circuit 100. Resolver 314 is connected to a summer 323 by an output line 324. Summer 323 is connected by an output line 325 to resolver 316. Resolver 316 is connected to a high gain feedback amplifier 326 by an output line 327. Amplifier 326 is connected to angle measuring circuit 100 by an output line 328. Amplifier 326 is also connected to summer 323 by an output line 402. A connection line 403 provides an angular error of A to summer 323. Resolver 314 has an input 405 supplying negative angle B. Resolver 315 has an input 406 supplying angle psi-A from a summer 502. Summer 502 is connected to line 240 by a line 503 and to line 242 by a line 504. Resolver 316 has an input 407 supplying angle theta. In operation inputs $e_3$, $e_4$ and $e_5$ are transformed into the angular errors relating to theta, phi and psi as defined in the reference frame.

Figure 5:
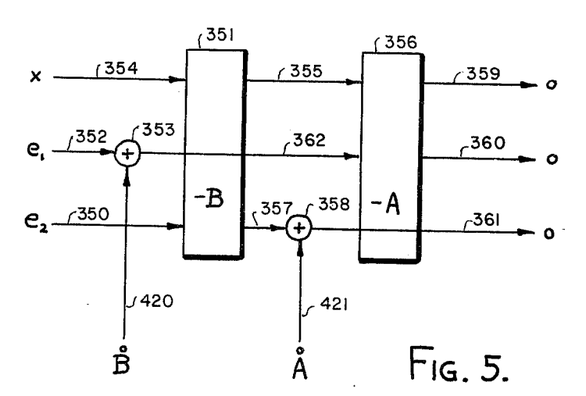
FIG. 5 is a schematic representation of a translation coordinate transformer with two resolvers in accordance with an embodiment of this invention.

Following is a more detailed explanation of the derivation of the transformations performed on $e_1$ and $e_2$ which represent angular pointing errors defined in the pointing frame. The goal is to derive the angular errors of angles A and B. Let the angular errors $e_1$ and $e_2$ correspond to errors about the $y$ and $z$ axes respectively and be operated upon by the transformation indicated within brackets 252 of FIG. 4. Let the angular error about the $x$-axis of the pointing frame also be included as an input to this transformation. A block diagram of the transformation with such inputs is shown in FIG. 5. An input line 350 connects $e_2$ to B resolver 351. An input line 352 connects $e_1$ to a summer 353. An input line 354 connects the angular error about the $x$-axis to resolver 351. An output line 355 connects resolver 351 to a resolver 356. An output line 357 connects resolver 351 to a summer 358. Output lines 359 and 360 come from resolver 356. Output line 361 comes from summer 358. An input line 420 supplies an angular error of angle B to summer 353. An input line 421 supplies an angular error of angle A to summer 358.

In operation, at each rotation involved in the transformation the angular error component corresponding to that rotation is presumed removed. As a result, after the two rotations involved in the transformation shown in FIG. 5 the net angular error must be zero. The rotation involving angle A, resolver 356, gives zero outputs on output lines 359 and 360. Accordingly, the inputs to resolver 356 on line 355 and on a line 362 from summer 353 to resolver 356 must both be zero. This means the resolution consisting of the rotation A of resolver 356 can be deleted. Further, since the $x$ component out of the B resolver 351 on output line 355 must be zero, it can be forced to essentially zero by feeding back whatever error occurs on output line 355 to the $x$ input via a high gain inverting amplifier. A high gain amplifier 363 is shown in FIG. 4 as being connected in a feedback loop around the B transformation block. In summary, operating on the angular components $e_1$ and $e_2$ using the arrangement shown in FIG. 4 gives the required angular errors of angles A and B. These angular errors are applied to angle measuring circuit 100 to make the appropriate modification in the angles A and B.

Figure 6:
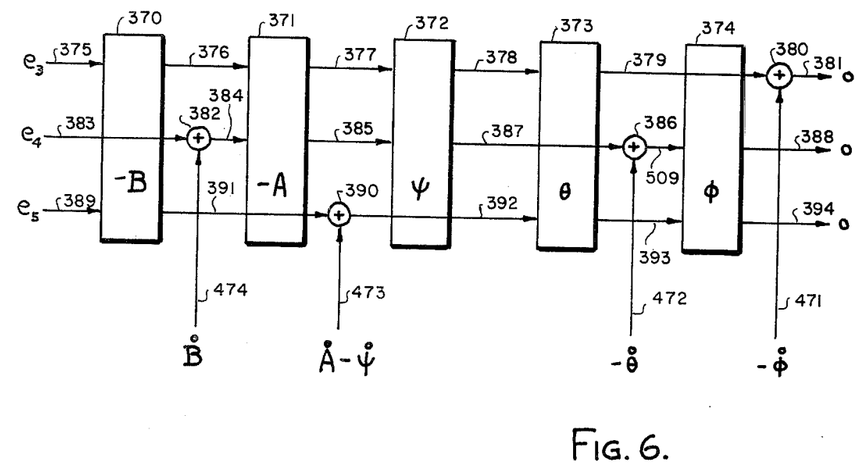
FIG. 6 is a schematic representation of an orientation coordinate transformer with five resolvers in accordance with an embodiment of this invention.

Analogous to the transformation done on $e_1$ and $e_2$, a transformation is performed on components $e_3$, $e_4$ and $e_5$ from decoupling matrix 306. Error angles $e_3$, $e_4$ and $e_5$ involve only the orientation angles and are expressed as vector components in the pointing frame. Let these components be operated on by a transformation represented within brackets 252 of FIG. 4 and the implicit transformation between the radiator and the sensor coils. The inverse of the transformation between the radiator and the sensor coils is shown with brackets 250 in FIG. 4. These transformations are shown in FIG. 6. As before, at each point in the transformation the error angles corresponding to the angles of each rotation are subtracted. The result, as before, should be a zero net error angle.

Resolvers 370 and 371 refer to the pointing angle transformations. Resolvers 372, 373 and 374 refer to the Euler angle transformations. A connection 375 connects $e_3$ to resolver 370, a connection 376 connects resolver 370 to resolver 371, a connection 377 connects resolver 371 to resolver 372, a connection 378 connects resolver 372 to resolver 373, a connection 379 connects resolver 373 to a summer 380. A connection 381 to summer 380 provides an output. Error angle $e_4$ is connected to a summer 382 by a connection 383. Summer 382 is connected to resolver 371 by a connection 384. Resolver 371 is connected to resolver 372 by a connection 385. Resolver 372 is connected to a summer 386 by a connection 387. Summer 386 is connected to resolver 374 by a connection 509. A connection 388 from resolver 374 provides an output. Error angle $e_5$ is connected to resolver 370 by a connection 389. Resolver 370 is connected to a summer 390 by a connection 391. Summer 390 is connected to resolver 373 by a connection 392. Resolver 373 is connected to resolver 374 by a connection 393. An output connection 394 is connected to resolver 374. A connection 471 applies the angular error of phi to summer 380. A connection 472 applies the angular error of theta to summer 386. A connection 473 applies the angular difference between angle psi and angle A, now defined as sigma ($\sigma$), to summer 390. A connection 474 applies the angular error of B to summer 382.

The last resolution, involving the rotation phi ($\phi$) of resolver 374, has both outputs zero and therefor both its inputs must also be zero. Accordingly, the last transformation can be eliminated. Also, let a new transformation sigma be defined as psi ($\psi$) - A. As a result, the two cascaded rotations of −A and psi can be combined into one rotation sigma. The angular errors of angle theta ($\theta$) and angle phi follow directly from the eliminations of the phi resolution. The angular error of psi can be determined implicitly by forcing the angular error about the z-axis of the theta resolution, resolver 373, to be zero. As before, this is done by using a high gain inverting feedback amplifier and feeding back to where the angular error of sigma was removed. FIG. 4 shows this inverting amplifier 326. Since the angular error of angle A was previously determined and since the angular error of psi equals the angular error of sigma plus the angular error of A, a measure of the angular error of psi is determined.

It should be pointed out that the sequence of angles and their corresponding axes of rotation, for the pointing coordinate transformation circuit 252, the relative orientation coordinate transformation circuit 250, and transformations shown in FIGS. 5 and 6 are not unique. That is, other angle definitions and rotation sequences can be used for the transformations subject to their having the required pointing and relative orientation freedom.

It should be pointed out that the implementation of the invention can be done using state-of-the-art techniques using digital, analog or hybrid circuitry.

In the discussion above it is to be understood that the sense circuits 26 are internally supplied with the components of the excitation signals from sources 68, 70 and 140 in order to logically perform the discriminating sensing function required of sensing circuits 26.

The resolvers which form components of the circuitry described herein may be fabricated, by way of example, in accordance with the teachings of U.S. Pat. Nos. 3,187,169 issued June 1, 1965 and 2,927,734 issued Mar. 8, 1960. The sensing circuits, again by way of example, may be fabricated in accordance with the teachings of a circuit diagram appearing at page 67 of the book entitled "Electronics Circuit Designers Casebook", published by Electronics, Mc-Graw Hill, No. 14—6. The angle measuring circuitry may take the form of any of a vast number of well-known Type I Servomechanism. There are, of course, numerous alternate constructions available for each of these components as will be readily appreciated by those skilled in the art.

While the invention has been described in detail as a system for tracking the movement and angular orientation of a generalized remote object, it should be readily apparent to one art-skilled that the invention may be used in a variety of object locating, tracking and orientation angle determination applications. One application currently in development is tracking the movement and orientation of an observers head, or more specifically, his line-of-sight for use in a Visually-Coupled-Control System. Other aircraft navigation problems suitable for handling with the invention include airborne alignment of missile systems, automated coupling of boom-nozzle and receptacle for inflight refuelling of aircraft, formation flying, instrument landing of vertical take-off and landing craft, and the like.

While the above description treats preferred embodiments of the invention, it should be readily apparent that a variety of modificatons may be made in the system and process within the scope of the appended claims. For example, the magnetic field may be replaced by a sonic field or a light field. The radiators could be chosen to produce the type of field desired.

The embodiments of the invention in which an exclusive property or privilege is claimed are defined as follows:

1. An object locating system in which the object is free to translate and orient in three dimensions and which comprises:
   three orthogonal radiators for defining a reference coordinate frame and for radiating a directable nutating field about a pointing vector direction;
   a pointing coordinate frame having the x-axis coincident with the pointing vector direction and the y-axis in the x-y plane of the reference frame;
   three orthogonal sensors located at the object to be tracked for sensing the nutating field and for defining a sense coordinate frame;
   sources of signals to be passed through each of the three radiators;
   means for measuring signals induced in the sensors;
   means for processing the signals induced in the sensors to determine the translation displacement of the sense frame with respect to the x-axis of the pointing frame and the orientation displacement of the sense frame with respect to the pointing frame; and
   means for determining the translation displacement of the sense frame with respect to the pointing vector defined in the reference frame and the orientation displacement of the sense frame with respect to the reference frame.

2. The system as set forth in claim 1 wherein said means for determining the translation and orientation displacements of the sense frame with respect to the reference frame includes:
   a decoupling matrix to decouple the signals representing the translation and orientation displacements of the sense frame with respect to the pointing frame so that each signal represents only one translation or orientation displacement with respect to the pointing frame;
   a translation coordinate transformer apparatus having as inputs two signals decoupled by said decoupling matrix, representing the translation displacement of the sense frame from the x-axis of the pointing frame and having as outputs two signals representing the translation displacement of the sense frame from the pointing vector defined in the reference frame; and
   an orientation coordinate transformer apparatus having as inputs three signals decoupled by said decoupling matrix, representing the orientation displacement of the sense frame from the pointing frame and having as outputs three signals representing the difference between the actual Euler angles which define the sense frame with respect to the reference frame and previously assumed Euler angles defining the sense frame with respect to the reference frame.

3. The system as set forth in claim 2 wherein said translation coordinate transformer apparatus includes:
   a resolver means receiving a first and second input signal, the first input signal representing a vector component which in turn represents the translation displacement of the sense frame from the x-axis of the pointing frame, the resolver means being continuously set to resolve the input signals into a first intermediate signal and a first output signal component which is oriented with respect to the reference frame;
   feedback means connected to the resolver means so as to receive the first intermediate signal as an input, the feedback means being operable to provide the second input signal to the resolver which after resolution in said resolver means will result in the first intermediate signal being zero or essentially zero; and
   a connecting means coupled to the resolver means for receiving a third input signal representing a vector component which in turn represents the translation displacement of the sense frame about one of said pointing frame axes and for providing a second output signal component from the resolver means which is oriented with respect to the reference frame.

4. The system as set forth in claim 2 wherein said orientation coordinate transformer apparatus includes:
   a first resolver means receiving a first and second input signal representing vector components which in turn represent the orientation displacement of the sense frame about two of the pointing frame axes, the first resolver means being continuously set to resolve the first and second input signals into a first and a second intermediate output component;
   a first summer means summing a third input signal representing a vector component which in turn represents the orientation displacement of the sense frame about one of the pointing frame axes and a translation displacement signal with respect to one of the axes of the reference frame and providing a third intermediate output signal;
   a second resolver means receiving the first and third intermediate output signals and being continuously set to resolve the first and third intermediate output signals into a fourth intermediate signal and a first output signal component oriented with respect to the reference frame;
   a second summer means summing the second intermediate output signal, a translation displacement signal with respect to one of the axes of the reference frame and a fifth intermediate output signal providing a sixth intermediate output signal;
   a third resolver means receiving the fourth and sixth intermediate output signals and being continuously set to resolve the fourth and sixth intermediate output signals into a seventh intermediate output signal and a second output signal component oriented with respect to the reference frame; and
   feedback means connected to the third resolver means so as to receive the seventh intermediate output signal as an input, the feedback means being operable to provide a third output signal component and said fifth intermediate output signal oriented with respect to the reference frame.

5. An object tracking system for tracking the position and angular orientation of an object free to translate and orient in three dimensions, said system comprising:

means for generatng a series of three primary reference signals, said primary reference signals being a DC signal, a first AC signal and a second AC signal in phase quadrature with said first AC signal and said primary reference signals being aligned along the axes of a pointing coordinate frame, the DC signal being aligned with the x-axis, the first AC signal being aligned with the y-axis and the second AC signal being aligned with the z-axis;

first means for transforming said primary reference signals in accordance with a first transformation representing a presumed pointing angle so the signals defined in the pointing frame are now defined in an orthogonal reference coordinate frame;

means including three orthogonal radiators coincident with the axes of the reference frame for radiating said transformed primary reference signals;

means including three orthogonal sensors defining a sense coordinate frame for sensing the transformed primary reference signals to produce sense signals, said sensing means being rigidly affixed to the object;

second means for transforming said sense signals in accordance with a second transformation which is the inverse of a presumed set of orientation angles of the sense frame with respect to the reference frame;

third means for transforming said sense signals in accordance with a third transformation which is the inverse of said first transformation, said third means receiving as inputs the outputs from the second means;

means for deriving from the sense signals so transformed by the second and third means the deviation of the position and orientation of the sense frame from the presumed pointing and orientation angles as expressed with respect to the pointing coordinate frame;

a decoupling matrix to receive and decouple the signals representing the translation and orientation displacements of the sense frame with respect to the pointing frame so that each signal represents only one translation or orientation displacement with respect to the pointing frame;

a translation coordinate transformer apparatus having as inputs two signals representing the translation displacement of the sense frame from the x-axis of the pointing frame and having as outputs two signals representing the translation displacement of the sense frame from the pointing vector defined in the reference frame;

an orientation coordinate transformer apparatus having as inputs three signals representing the orientation displacement of the sense frame from the pointing frame and having as outputs three signals representing the difference between the actual Euler angles which define the sense frame with respect to the reference frame and presumed Euler angles defining the sense frame with respect to the reference frame; and means for altering the presumed pointing and orientation angles as defined in the reference frame in accordance with errors in the presumed pointing and orientation angles as defined in the reference frame.

6. The system as set forth in claim 5 wherein said translation coordinate transformer apparatus includes:

a resolver means receiving a first and second input signal, the first input signal representing a vector component which in turn represents the translation displacement of the sense frame from the x-axis of the pointing frame, the resolver means being continuously set to resolve the input signals into a first intermediate signal and a first output signal component which is oriented with respect to the reference frame;

feedback means connected to the resolver means so as to receive the first intermediate signal as an input, the feedback means being operable to provide the second input signal to the resolver which after resolution in said resolver means will result in the first intermediate signal being zero or essentially zero; and a connecting means coupled to the resolver means for receiving a third input signal representing a vector component which in turn represents the translation displacement of the sense frame about one of said pointing frame axes and for providing a second output signal component from the resolver means which is oriented with respect to the reference frame.

7. The system as set forth in claim 5 wherein said orientation coordinate transformer apparatus includes:

a first resolver means receiving a first and second input signal representing vector components which in turn represent the orientation displacement of the sense frame about two of the pointing frame axes, the first resolver means being continuously set to resolve the first and second input signals into a first and a second intermediate output component;

a first summer means summing a third input signal representing a vector component which in turn represents the orientation displacement of the sense frame about one of the pointing frame axes and a translation displacement signal with respect to one of the axes of the reference frame and providing a third intermediate output signal;

a second resolver means receiving the first and third intermediate output signals and being continuously set to resolve the first and third intermediate output signals into a fourth intermediate signal and a first output signal component oriented with respect to the reference frame;

a second summer means summing the second intermediate output signal, a translation displacement signal with respect to one of the axes of the reference frame and a fifth intermediate output signal providing a sixth intermediate output signal;

a third resolver means receiving the fourth and sixth intermediate output signals and being continuously set to resolve the fourth and sixth intermediate output signals into a seventh intermediate output signal and a second output signal component oriented with respect to the reference frame; and feedback means connected to the third resolver means so as to receive the seventh intermediate output signal as an input, the feedback means being operable to provide a third output signal component and said fifth intermediate output signal oriented with respect to the reference frame.

8. A process for tracking an object free to translate and to orient in three dimensions relative to a reference frame defined by a radiator grouping the process comprising:

radiating a nutating field describing a conical motion about a pointing vector which defines the x-axis of a pointing coordinate frame, the y-axis of the pointing frame being in the x-y plane of the reference frame;

sensing the radiated field in three orthogonal axes of a sense coordinate frame attached to the object, to produce an output signal for each axis;

determining the position and orientation error as defined in the pointing frame with respect to a presumed angular position of the object and a presumed angular orientation of the object by comparing said sensed output signals in each of said three orthogonal axes due to said sensed radiation field with presumed output signals that would be sensed in said three orthogonal axes in said presumed angular position and orientation, and determining the difference between said sensed output signals and said presumed output signals;

transforming the errors of the angular position and angular orientation of the object from the pointing frame to the reference frame; and altering, if said difference between said sensed output signals and said presumed output signals is not zero, the presumed angular position and orientation as defined in the reference frame in accordance with the generated errors of the presumed angular position and orientation as defined in the reference frame.

9. The process as set forth in claim 8 wherein determining the position and orientation error as defined in the pointing frame and transforming the errors of the angular position and angular orientation of the object from the pointing frame to the reference frame includes:

decoupling the signals representing the translation and orientation displacements of the sense frame with respect to the pointing frame so that each signal represents only one translation or orientation displacement with respect to the pointing frame;

transforming coordinates of two signals representing the translation displacement of the sense frame from the x-axis of the pointing frame to produce as outputs two signals representing the translation displacement of the sense frame from the pointing vector defined in the reference frame; and transforming coordinates of signals representing the orientation displacement of the sense frame from the pointing frame to produce as outputs three signals representing the difference between the actual Euler angles which define the sense frame with respect to the reference frame and the presumed Euler angles which presumably define the sense frame with respect to the reference frame.

10. The process as set forth in claim 9 wherein the radiator grouping includes electrically conducting coils and the field includes electromagnetic radiation.

* * * * *